(12) United States Patent
Gambirasio et al.

(10) Patent No.: US 7,366,384 B2
(45) Date of Patent: Apr. 29, 2008

(54) MICROSTRUCTURED OPTICAL FIBRE

(75) Inventors: Alfredo Gambirasio, Milan (IT); Francesco Maria Tassone, Avellino (IT); Martino Travagnin, Monza (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/550,463

(22) PCT Filed: Mar. 31, 2003

(86) PCT No.: PCT/EP03/03361

§ 371 (c)(1),
(2), (4) Date: Jun. 14, 2006

(87) PCT Pub. No.: WO2004/088377

PCT Pub. Date: Oct. 14, 2004

(65) Prior Publication Data

US 2006/0239627 A1   Oct. 26, 2006

(51) Int. Cl.
*G02B 6/02* (2006.01)
*G02B 6/32* (2006.01)

(52) U.S. Cl. .................................. 385/123; 385/125
(58) Field of Classification Search .................... None
See application file for complete search history.

(56) References Cited

U.S. PATENT DOCUMENTS 6,512,871 B2 * 1/2003 Kumel et al. ............... 385/123
6,856,742 B2 * 2/2005 Broeng et al. .............. 385/125

FOREIGN PATENT DOCUMENTS

| EP | 0 905 834 A2 | 3/1999 |
|---|---|---|
| EP | 0 905 834 A3 | 3/1999 |
| EP | 1 118 887 A2 | 7/2001 |
| EP | 1 279 978 A1 | 1/2003 |
| WO | WO 01/98819 A2 | 12/2001 |
| WO | WO 02/39161 A1 | 5/2002 |
| WO | WO 02/084350 A1 | 10/2002 |

OTHER PUBLICATIONS

Xu, J. et al., "Cylindrically Symmetrical Hollow Fiber," Optics Communications 182, pp. 343-348, (Aug. 15, 2000).
Richardson, D. J. et al., "Holey Fibres-A Review of Recent Developments in Theory, Fabrication and Experiment," ECOC 2000, vol. 4, 5 Sheets, (2000).
Hasegawa, T. et al., "Novel Hole-Assisted Lightguide Fiber Exhibiting Large Anomalous Dispersion and Low Loss Below 1 db/km," OFC 2001, pp. PD5-1 to PD5-3, (2001).

* cited by examiner

*Primary Examiner*—Hemang Sanghavi
*Assistant Examiner*—Omar Rojas
(74) *Attorney, Agent, or Firm*—Finnegan, Henderson, Farabow, Garrett & Dunner, L.L.P.

(57) ABSTRACT

A microstructured optical fiber has a core region with a material having a refractive index $n_{co}$ and a microstructured region surrounding the core region with a background material having a refractive index $n_m$ which is lower than the refractive index $n_{co}$. The microstructured region has a plurality of microstructures having a refractive index different from the refractive index $n_m$, wherein the distance $\Delta_\varphi$ between the centers of any couple of adjacent microstructures is at least equal to about $\lambda_p$ and not higher than about $1.5\lambda_p$, wherein $\lambda_p$ is the spatial variation length of the electric field intensity in the microstructured region.

18 Claims, 7 Drawing Sheets

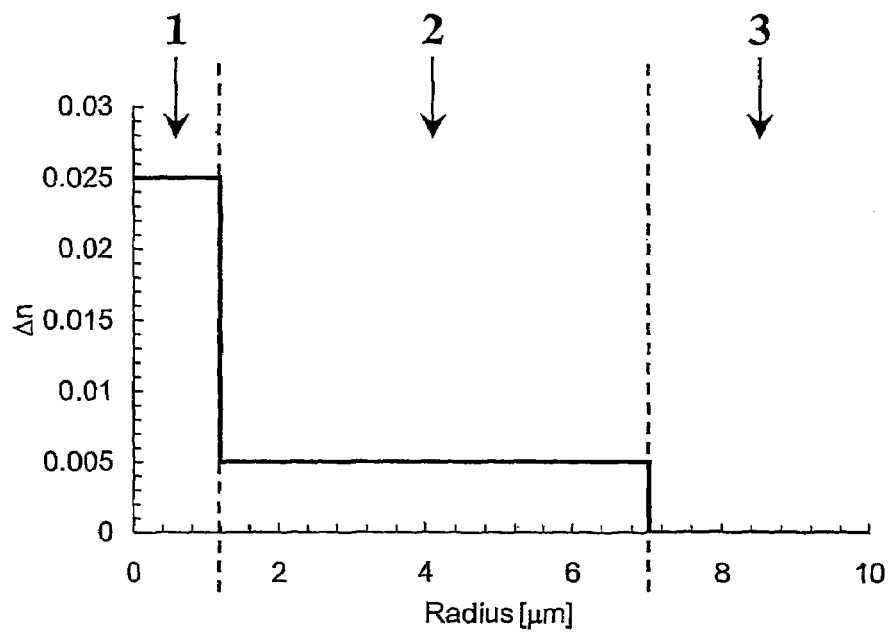
Fig. 5
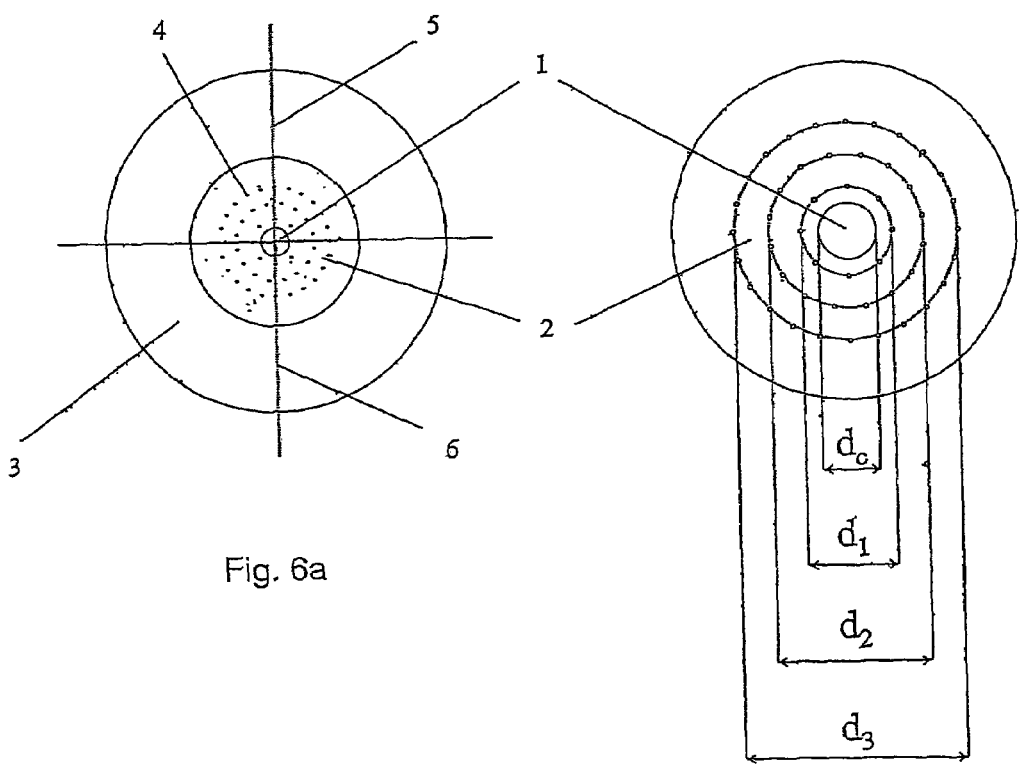
Fig. 6a
Fig. 6b

MICROSTRUCTURED OPTICAL FIBRE

CROSS REFERENCE TO RELATED APPLICATION

This application is a national phase application based on PCT/EP2003/003361, filed Mar. 31, 2003, the content of which is incorporated herein by reference.

BACKGROUND OF THE INVENTION

1. Field of the Invention

The present invention relates to a microstructured optical fibre.

Furthermore, the present invention relates to an optical communication line and an optical communication system comprising said microstructured optical fibre and to a method and a preform for making the same.

2. Description of the Related Art

As known, the optical fibres are commonly used in the field of optical telecommunications for the transmission of signals. Essentially they typically comprise an inner cylindrical region, called core, within which an optical signal is, transmitted and an outer annular region, called cladding. The cladding has a refractive index lower than that of the core in order to confine the signal transmitted within the latter.

Typically, the core and the cladding are made from a silica based vitreous material and the difference in the refractive index between the core and the cladding is obtained by incorporating suitable additives (dopants) in the vitreous matrix of the core and/or of the cladding.

A microstructured optical fibre is an optical fibre having small structures such as, for example, air holes running through the fibre lengthwise.

Three different types of microstructured fibres—corresponding to three different principles of propagation—have been distinguished and described in the prior art (see for example, D. J. Richardson et al., "Holey fibers—A review of recent developments in theory, fabrication and experiment", ECOC 2000, Vol. 4, page 37).

In the first type of fibre (hereafter called microstructured clad fibre or MCF) the core and the cladding are made of the same homogeneous background material (e.g., silica). Guided propagation in the core is achieved by providing the cladding with microstructures (e.g., air holes) having a refractive index lower than the refractive index of the background material.

In the second type of fibre (hereafter called photonic bandgap fibre or photonic crystal fibre), the core and the cladding are made of the same homogeneous background material (e.g., silica) and the cladding is provided with microstructures (e.g., air holes) arranged according to an appropriate periodic array. The periodic array forms in the cladding a photonic bad-gap at the propagation wavelength so that light is confined in the core thanks to total reflection at the core/cladding interface.

In the third type of microstructured fibre (hereafter called microstructure assisted fibre, or MAF), the core and the cladding are made of different background materials (e.g., doped silica/silica) so that guided propagation in the core is achieved mainly thanks to a refractive index difference between the core and the cladding background materials, just as in a conventional fibre. The cladding is provided with microstructures having the role of tailoring the optical properties of the fibre.

The present invention relates to this third type of microstructure assisted fibres.

Throughout the present description and claims, the expression

"microstructure" is used to indicate a structure (e.g., a hole, a column, a ring, a cellular ring structure) which is disposed in a background material of a microstructured optical fibre, has a refractive index different from the refractive index of the background material and runs through the fibre lengthwise;

"microstructured region" is used to indicate a region of a microstructured optical fibre wherein microstructures are provided;

"background material" is used to indicate the material of a microstructured region wherein the microstructures are disposed; that is the material of the interstitial spaces between the microstructures of a microstructured region;

"chromatic dispersion coefficient D" is used to indicate the first order dependency of the group velocity from the wavelength. In particular, the chromatic dispersion coefficient D is expressed as follows $$D = \frac{d\beta_1}{d\lambda} = -\frac{2\pi c}{\lambda^2}\beta_2$$

where $\beta_1$ and $\beta_2$ are the constant of propagation of the mode of the first and, respectively, of the second order, $\lambda$ is the wavelength and D is expressed in ps/(nm*Km);

"slope of chromatic dispersion S" or "slope S", unless otherwise stated, is used to indicate the derivative, with respect to the wavelength, of the chromatic dispersion coefficient D and is expressed in ps/(nm$^2$*Km);

"transmission optical fibre" is used to indicate an optical fibre used in a line or in an optical communication system for the transmission of optical signals from one point to another one located at an appreciable distance (for example, of at least some km or tenths of km).

Takemi Hasegawa et al., ("Novel hole-assisted lightguide fiber exhibiting large anomalous dispersion and low loss below 1 dB/Km", OFC 2001, paper PD5-1) disclose a hole assisted lightguide fibre (HALF) wherein the role of the holes is to depress the effective refractive index around the core so as to form equivalent W-shaped structure for chromatic dispersion compensation. The HALF disclosed has a pure silica core, a fluorine-doped silica cladding and four holes that directly surround the core. The diameter of the core and holes is 10 μm and 5 μm, respectively.

WO 01/98819 discloses a microstructured fibre including a core region, a moat region including a ring of air columns, and a cladding region, surrounding the core and moat regions, which comprises either a periodic lattice of columns formed from a solid material or a solid ring. The core region is formed from a high index material and the moat region is formed from a material having a refractive index lower than the refractive index of the core region. The cladding region is formed from a material having a refractive index which is higher than the refractive index of the moat region and lower than the refractive index of the core region. Furthermore, the columns of the moat region contact the outer circumference of the column structure forming the core region. The distance between the centres of adjacent columns is not mentioned in this document.

The Applicant observed that in order to obtain a smooth and effective changing effect of the refractive index in the microstructured region of a microstructured fibre, a high number of microstructures is required. That is, structures closely spaced and small in diameter are desirable.

Furthermore, the Applicant noted that a high number of microstructures is required also to improve the stability of the optical fibre performance with respect to imperfect positioning and/or size of the microstructures.

On the other hand, the Applicant observed that a small number of microstructures is desirable for other technological problems. For example, it is desirable for making the production process of a microstructured fibre easier, for improving the strength of the fibre, for improving fibre splicing and for reducing the fibre attenuation. As to the fibre attenuation, the Applicant remarks—in fact—that in a microstructured fibre the existence of a free glass surface in the air holes may be a source for water pollution during the fibre preform drawing process and an additional source of Rayleigh scattering from the roughness of the surface.

Accordingly, the Applicant faced the technical problem of providing a microstructure assisted optical fibre that allows to achieve a good compromise between the above mentioned conflicting requirements.

SUMMARY OF THE INVENTION

The Applicant found that this problem is solved by a microstructure assisted optical fibre wherein the distance $\Delta_\phi$ (measured in a cross-section of the fibre) between the centres of any couple of adjacent microstructures is at least of about $\lambda_p$ and not higher than about $1.5\lambda_p$, wherein $\lambda_p$ is a characteristic parameter of the microstructured optical fibre.

More in particular, $\lambda_p$ is the length characterizing the spatial variation of the electric field intensity in the microstructured region of the fibre and is defined by the following relationship:

$$(1/\lambda_p)^2 = \beta^2 - n_m^2 \cdot (2\pi/\lambda)^2 \qquad (1)$$

where $\beta$ is the propagation wavenumber, $n_m$ is the background material refractive index of the microstructured region and $\lambda$ is the free-space propagation wavelength.

Furthermore, $\lambda_p$ can be obtained from the electric field intensity of a microstructured optical fibre by the following relationship:

$$\lambda_p = 2 \frac{\rho_2 - \rho_1}{\ln\left(\frac{I_1}{I_2}\right)} \qquad (2)$$

where $\rho_1 = r_{h,min} - \Delta_\rho$; $\rho_2 = r_{h,max} + \Delta_\rho$; $r_{h,min}$ is the distance between the centre of the innermost microstructure and the centre of the fibre; $r_{h,max}$ is the distance between the centre of the outermost microstructure and the centre of the fibre; $\Delta_\rho$ is the distance between the centre of the innermost microstructure and the edge of the core region and $I_i$ is the electric field intensity at the distance $\rho_i$ computed along any radial direction.

The Applicant found that the relationship $\Delta_\phi \leq 1.5\lambda_p$ allows to achieve satisfactory results as far as the changing effect of the refractive index and the stability are concerned while the relationship $\Delta_\phi \geq \lambda_p$ allows to achieve satisfactory results as far as the fibre production process, fibre splicing, fibre attenuation and fibre strength are concerned.

Accordingly, in a first aspect the present invention relates to a microstructured optical fibre comprising a core region with a material having a refractive index $n_{co}$ and a microstructured region, surrounding the core region, with a background material having a refractive index $n_m$ which is lower than the refractive index $n_{co}$, the microstructured region comprising a plurality of microstructures having a refractive index different from the refractive index $n_m$, characterized in that the distance $\Delta_\phi$ between the centres of any couple of adjacent microstructures is at least equal to, about $\lambda_p$ and not higher than about $1.5\lambda_p$, wherein $\lambda_p$ is the spatial variation length of the electric field intensity in the microstructured region.

The dependent claims set out particular embodiments of the invention.

Preferably, the distance $\Delta_\phi$ is not higher than about $1.3\lambda_p$. More preferably, the distance $\Delta_\phi$ is about $\lambda_p$. These relationships allow to improve the smooth and effective changing effect of the refractive index and the stability of the fibre.

Advantageously, the distance $\Delta_\rho$ between the centre of an innermost microstructure and the edge of the core region is at least of about $0.50\lambda_p$. This allows the fibre stability to be further increased.

Advantageously, the distance $\Delta_\rho$ between the centre of an innermost microstructure and the edge of the core region is not higher than about $0.75\lambda_p$. Preferably, the distance $\Delta_\rho$ is not higher than about $0.65\lambda_p$. These relationships allow the optical performance of the fibre (e.g. the macrobending and dispersion properties) to be improved.

Advantageously, $\lambda_p$ is not higher than 7 μm. More preferably, $\lambda_p$ is not higher than 5 μm. The Applicant found that fibres having $\lambda_p \leq 7$ μm (more preferably, $\lambda_p \leq 5$ μm) allow high absolute values of negative dispersion to be achieved. Moreover, the Applicant found that these fibres show good confinement of the electric field so that they are robust with respect to other optical properties such as, for example, macrobending.

Advantageously, $\lambda_p$ is at least of about 1 μm. Preferably, the microstructure diameter is at least of about 0.2 μm. These relationships allow the holes to be well spaced apart and the manufacturing of the fibre to be made easier.

Typically, the microstructures have a diameter substantially equal to each other.

Advantageously, the difference $\Delta n_{co,m}$ between the refractive indexes $n_{co}$ and $n_m$ is of at least $3 \ast 10^{-3}$.

Typically, the core and the microstructured regions are made from a silica based vitreous material. The refractive index difference $\Delta n_{co,m}$ between the two regions is typically obtained by incorporating suitable dopants (such as, for example, germanium, phosphorus and/or fluorine) in the vitreous matrix of the core region and/or the microstructured region.

Advantageously, the plurality of microstructures is arranged in at least one shell. Typically, said at least one shell has a circular shape or another regular shape as, for example, polygonal.

Typically, the distance $\Delta_\phi$ between the centres of any couple of adjacent microstructures which belong to the same shell is the same.

According to an embodiment, the microstructured optical fibre also comprises a cladding region surrounding the microstructured region.

Typically, the cladding region comprises a material having a refractive index $n_{cl}$ lower than the refractive index $n_m$ of the background material of the microstructured region. Advantageously, the difference $\Delta n_{m,cl}$ between the refractive indexes $n_m$ and $n_{cl}$ is of at least $10^{-3}$.

According to an alternative, the refractive index $n_{cl}$ is higher than the refractive index $n_m$.

Typically, the cladding region is made from a silica based vitreous material and the refractive index difference $\Delta n_{m,cl}$ between the microstructured and cladding regions is obtained by incorporating suitable dopants (such as, for example, germanium, phosphorus and/or fluorine) in the vitreous matrix of the microstructured region and/or the cladding region.

Typically, the microstructures have a refractive index lower than the refractive index $n_m$ of the background material of the microstructured region. For example, the microstructures comprise air or another dry gas.

In a second aspect, the present invention relates to an optical communication line comprising a microstructured optical fibre according to the first aspect of the invention.

As to the characteristics of the microstructured optical fibre reference is made to what already disclosed above.

Typically, the optical communication line further comprises an optical cable.

According to an embodiment, the microstructured optical fibre is within the optical cable.

According to an embodiment, the microstructured optical fibre is adapted to transmit at least one optical signal along an appreciable distance (for example, hundreds of meters or, preferably, some Km or tens of Km).

According to an embodiment, the optical cable comprises a transmission optical fibre. Typically, said transmission optical fibre is a conventional (not microstructured) optical fibre essentially comprising a core and a cladding with a refractive index lower than that of the core in order to confine the signal transmitted within the latter. Typically, the core and the cladding of the transmission optical fibre are made from a silica based vitreous material and the difference in the refractive index between the core and the cladding is obtained by incorporating suitable dopants (such as, for example, germanium, phosphorus and/or fluorine) in the vitreous matrix of the core and/or the cladding.

According to an embodiment, the microstructured optical fibre is adapted to compensate at least partly for the chromatic dispersion and/or chromatic dispersion slope of the optical communication line.

According to an embodiment, the microstructured optical fibre is adapted to achieve a predetermined Raman gain.

In a third aspect, the present invention relates to an optical communication system comprising a transmitting station for supplying an optical signal, a receiving station for receiving the optical signal and an optical communication line according to the second aspect of the invention.

As to the characteristics of the optical communication line reference is made to what already disclosed above.

In a fourth aspect the present invention relates to a method for making a microstructured optical fibre starting from a target fibre, the method comprising the steps of making a microstructured preform and drawing the microstructured preform into the microstructured optical fibre, wherein the step of making the preform comprises the steps of a) providing a core region having a material with a refractive index $n_{co}$;

b) providing a microstructured region, surrounding the core region, having a background material with a refractive index $n_m$ which is lower than the refractive index $n_{co}$, c) providing the microstructured region with a plurality of microstructures having a refractive index different from the refractive index $n_m$;

characterized in that the step of making the preform further comprises the step of d) spacing the microstructures apart from each other so that in the drawn microstructured optical fibre the distance $\Delta_\phi$ between the centres of any couple of microstructures is at least equal to about $\lambda_p$ and not higher than about $1.5\lambda_p$, wherein $\lambda_p$ is the spatial variation length of the electric field intensity of the target fibre.

The method of the invention allows to make a microstructure assisted optical fibre which has the desired optical properties (e.g., chromatic dispersion and/or chromatic dispersion slope) of a target fibre and is capable of achieving a good compromise between the above mentioned conflicting requirements (smooth, effective refractive index changing effect and stability versus technological problems in fibre production, splicing, attenuation and strength).

As to the characteristics of the core region, the microstructured region, the microstructures, the distance $\Delta_\phi$, the distance $\Delta_\rho$ between the centre of an innermost microstructure and the edge of the core region in the drawn microstructured optical fibre, the spatial variation length $\lambda_p$, the refractive indexes $n_{co}$ and $n_m$ reference is made to what already disclosed above with reference to the first aspect of the invention.

Typically, the target fibre comprises a core region and an outer core region surrounding the core region.

Advantageously, the refractive index difference $\Delta n_{co,m}$ between the core region and the background material of the microstructured region of steps a) and b) is substantially the same as the refractive index difference between the core region and the outer core region of the target fibre.

When the target fibre also comprises a cladding region surrounding the outer core region, the step of making the preform of the method of the invention preferably also comprises the step e) of providing a cladding region surrounding the microstructured region.

Typically, the cladding region provided in step e) has a refractive index $n_{cl}$ so that the refractive index difference $\Delta n_{m,cl}$ between the microstructured region and the cladding region is substantially the same as the refractive index difference between the outer core region and the cladding region of the target fibre.

As to the characteristics of the cladding region and the refractive index $n_{cl}$ reference is made to what already disclosed above with reference to the first aspect of the invention.

The step of making the preform of the method of the invention preferably also comprises the step f) of providing the microstructures with a diameter such as to tailor the desired optical properties (for example, the refractive index difference profile, the chromatic dispersion coefficient and/or the chromatic dispersion slope) of the microstructured fibre to those of the target fibre.

The step of making the preform of the method of the invention preferably also comprises the step g) of providing the microstructures in a number N of shells such as to tailor the desired optical properties (for example, the refractive index difference profile, the chromatic dispersion coefficient and/or the chromatic dispersion slope) of the microstructured fibre to those of the target fibre.

In a fifth aspect the present invention relates to a microstructured optical fibre preform comprising a core region with a material having a refractive index $n_{co}$ and a microstructured region, surrounding the core region, with a background material having a refractive index $n_m$ which is lower than the refractive index $n_{co}$, the microstructured region comprising a plurality of microstructures having a refractive index different from the refractive index $n_m$ characterized in that the microstructures are spaced apart so that in a microstructured optical fibre drawn from the preform the distance $\Delta_\phi$ between the centres of any couple of adjacent microstructures is at least equal to about $\lambda_p$ and not higher than about $1.5\lambda_p$, wherein $\lambda_p$ is the spatial variation length of the electric field intensity in the microstructured region of the microstructured optical fibre.

According to an embodiment, the optical fibre preform also comprises a cladding region surrounding the microstructured region.

As to the characteristics of the core region, the microstructured region, the cladding region, the microstructures, the distance $\Delta_\phi$, the distance $\Delta_{92}$ between the centre of an innermost microstructure and the edge of the core region for the microstructured optical fibre drawn from the preform, the spatial variation length $\lambda_p$, the refractive indexes $n_{co}$, $n_m$ and $n_{cl}$ reference is made to what already disclosed above with reference to the first aspect of the invention.

BRIEF DESCRIPTION OF THE DRAWINGS

Characteristics and advantages of the invention shall now be illustrated with reference to embodiments represented as a non-limiting example in the attached drawings in which:

FIG. 5 shows the refractive index difference profile for the background material of the core region, the microstructured region and cladding region of the fibre of FIG. 4;

FIG. 6a shows a schematic representation of a comparison microstructured optical fibre having three shells of air holes while FIG. 6b shows the enlarged core and microstructured regions of the fibre of FIG. 6a;

FIG. 8 shows the electric field along the Y axis calculated for the target fibre and for the fibres of FIGS. 4 and 6a;

FIG. 11 shows the WGD versus the hole diameter $d_h$ computed for the fibres of FIGS. 4 and 6a;

FIG. 12 shows the ratio WGD/S versus the hole diameter $d_h$ computed for the fibres of FIGS. 4 and 6a;

DETAILED DESCRIPTION OF THE INVENTION

Figure 1:
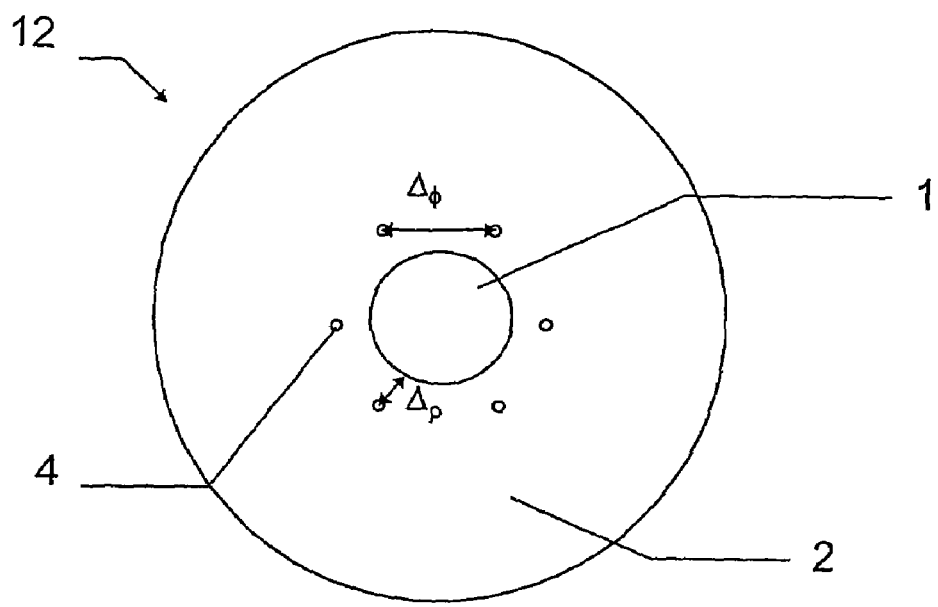
FIG. 1 shows a schematic representation of an embodiment of a microstructured optical fibre according to the invention.

FIG. 1 shows an embodiment of a microstructured optical fibre 12 according to the invention. The fibre 12 comprises a core region 1 and a microstructured region 2. The microstructured region 2 surrounds the core region 1 and comprises a plurality of microstructures 4 arranged in a shell. The core region 1 is free from microstructures.

The fibre 12 typically also comprises an outer protective coating of a polymeric material (not shown).

The microstructures 4 run through the microstructured optical fibre 12 lengthwise for the entire length.

In the embodiment illustrated in FIG. 1, the shape of the shell of microstructures 4 is, for example, substantially hexagonal.

According to the invention, the distance $\Delta_\phi$ between the centres of any couple of adjacent microstructures 4 is at least equal to about $\lambda_p$ and not higher than about $1.5\lambda_p$, wherein $\lambda_p$ is defined above.

In the embodiment shown, the distance $\Delta_\phi$ is the same for each couple of adjacent microstructures 4. However, it can also be different.

Furthermore, the distance $\Delta_\rho$ between the centre of an innermost microstructure and the edge of the core region is preferably at least of about $0.50\lambda_p$ and not higher than about $0.75\lambda_p$.

Moreover, the microstructures 4 advantageously all have substantially the same diameter $d_h$.

Because of the technological limitations and advantage of using relatively large and few holes, a minimum hole size $d_h > 0.2$ μm is preferred.

The microstructured region 2 is made from a background material having a refractive index $n_m$ which is lower than the refractive index $n_{co}$ of the material of the core region 1.

The core region 1 and the microstructured region 2 are typically made from silica based vitreous materials which are differently doped so as to achieve the desired refractive index difference $\Delta n_{co,m}$.

The microstructures 4 may, for example, be air holes.

The microstructured optical fibre 12 can be produced according to a known method.

Figure 2:
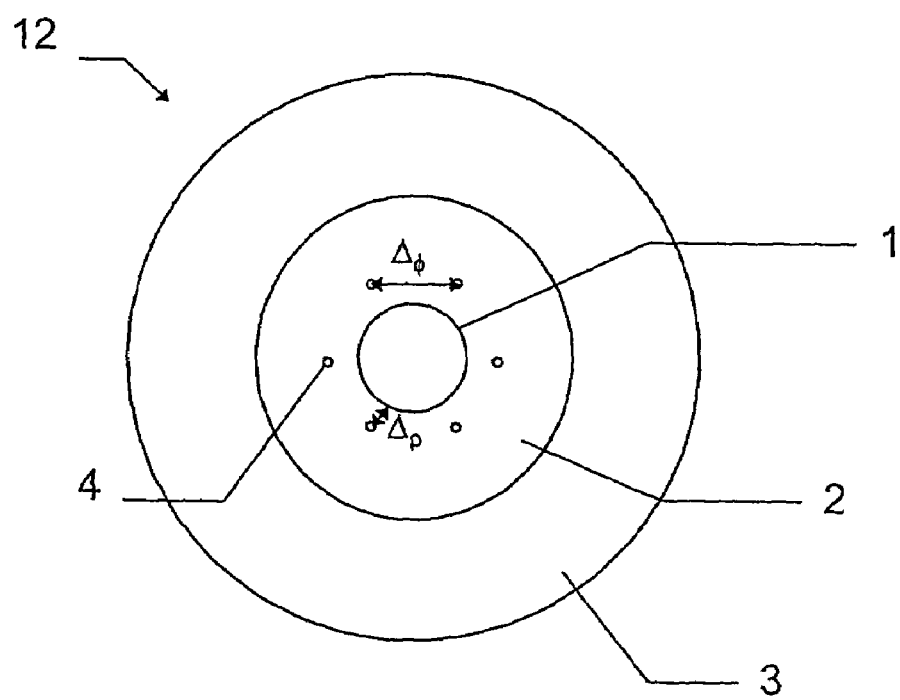
FIG. 2 shows a schematic representation of another embodiment of a microstructured optical fibre according to the invention.

FIG. 2 shows an other embodiment of a microstructured optical fibre 12 according to the invention which is similar to that shown in FIG. 1 except for the fact that the fibre 12 also comprises a cladding region 3 surrounding the microstructured region 2.

Typically, the cladding region 3 is free from microstructures and is made from a material having a refractive index $n_{cl}$ which is lower than the refractive index $n_m$ of the microstructured region 2.

Typically the cladding region 3 is made from a silica based vitreous material.

In both embodiments of FIGS. 1 and 2, one or more additional shells of microstructures may be arranged in the microstructured region. The number of the shells of microstructures 4 in the microstructured region 2, the distance $\Delta_\phi$ between the centres of each couple of adjacent microstructures, the distance $\Delta_\rho$, the microstructure diameter and the refractive indexes $n_{co}$, $n_m$ (and $n_{cl}$) are selected in order to achieve the desired optical properties for the microstructured optical fibre 12 and to comply with the relationship $1 \leq \Delta_\phi/\lambda_p \leq 1.5$ and, preferably, with the relationship $0.50 \leq \Delta_\rho/\lambda_p \leq 0.75$.

Figure 3:
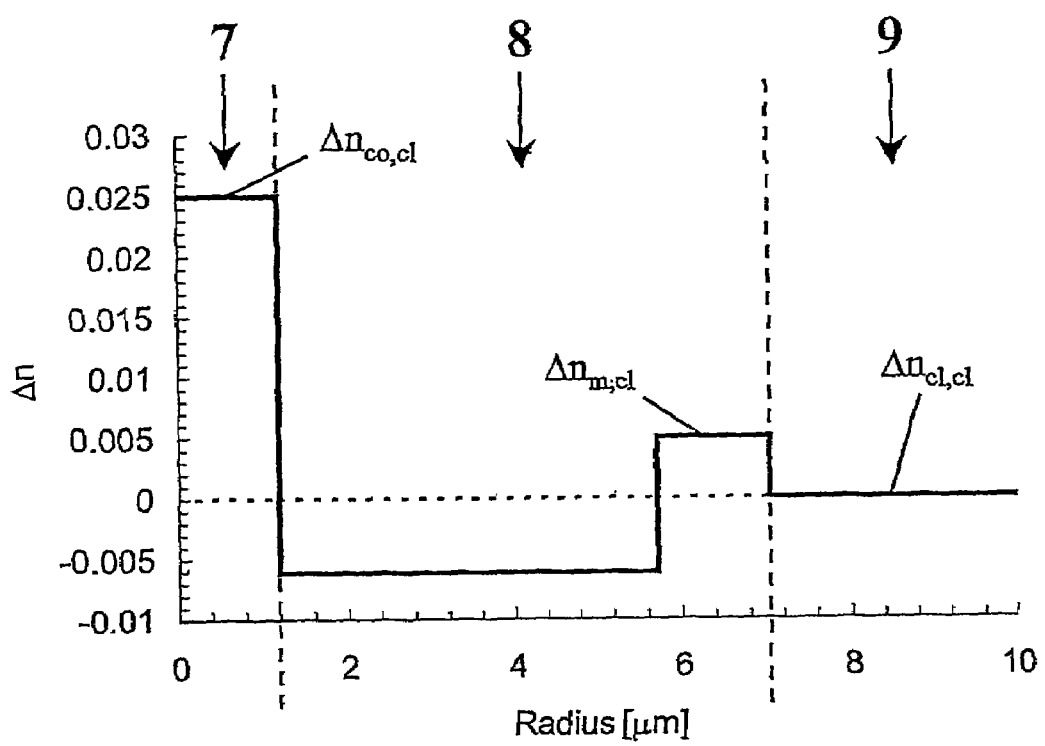
FIG. 3 shows a target refractive index difference profile for achieving high performance dispersion compensating optical fibre.

For example, FIG. 3 shows a typical refractive index difference profile of a target optical fibre having high performance in terms of chromatic dispersion compensation.

In FIG. 3, three regions are shown: a core region 7, an outer core region 8 wherein a refractive index depression is present and a cladding region 9. The refractive index difference is computed with reference to the cladding region refractive index.

In the case of a pure silica cladding region 9, having a refractive index of 1.440 at 1550 nm, the target fibre has a waveguide dispersion (WGD) of −397 ps/(nm*Km) and a chromatic dispersion slope (S, computed as the derivative, with respect to the wavelength, of the waveguide dispersion WGD) of −7.9 ps/(nm$^2$*Km), wherein the chromatic dispersion coefficient D defined above is obtained from the WGD by adding the material dispersion of the base material constituting the fibre. Depending on the content of dopants, material dispersion at 1550 nm typically varies between about +18 ps/(nm*km) to about +22 ps/(nm*km).

By using the above mentioned equation (1), a $\lambda_p$ value of about 1.8 µm is obtained for the target fibre of FIG. 3.

In order to obtain the refractive index depression in the outer core region 8 of FIG. 3 by using a conventional (non-microstructured) optical fibre, a concentration of about 2% in weight of fluorine (F) is, for example, required. However, the fluorine dopant has the drawback of quickly diffusing in the drawing process of the fibre thereby smoothing the sharp jumps of the refractive index profile and making the control of the resulting profile very difficult.

The use of microstructures 4 in substitution of chemical doping allows to overcome this problem.

According to the invention, the microstructured optical fibre 12 can be made in such a way as to obtain the desired optical properties of the target fibre of FIG. 3 and, at the same time, a number of microstructures which complies with the relationship of the invention $1 \leq \Delta_\phi/\lambda_p \leq 1.5$.

More in particular given the target fibre of FIG. 3—a microstructured optical fibre according to the invention can be made by
providing the microstructured fibre with a core region having a material with a refractive index $n_{co}$;
providing the microstructured fibre with a microstructured region, surrounding the core region, having a background material with a refractive index $n_m$ which is lower than the refractive index $n_{co}$ and such that the refractive index difference $\Delta n_{co,m}$ is substantially the same as the refractive index difference between the core region 7 and the outer core region 8 of the target fibre;
providing the fibre with a cladding region, surrounding the microstructured region, having a material with a refractive index $n_{c1}$ which is lower than the refractive index $n_m$ and such that the refractive index difference $\Delta n_{m,c1}$ is substantially the same as the refractive index difference between the outer core region 8 and the cladding region 9 of the target fibre;
providing the microstructured region with microstructures spaced apart from each other so as to comply with the requirement $1 \leq \Delta_\phi/\lambda_p \leq 1.5$;
arranging the microstructures in a number N of shells selected depending on the width of the refractive index depression of the target fibre;
selecting the microstructure diameter so as to tailor the WGD and S parameters of the microstructured fibre to those of the target fibre.

Figure 4:
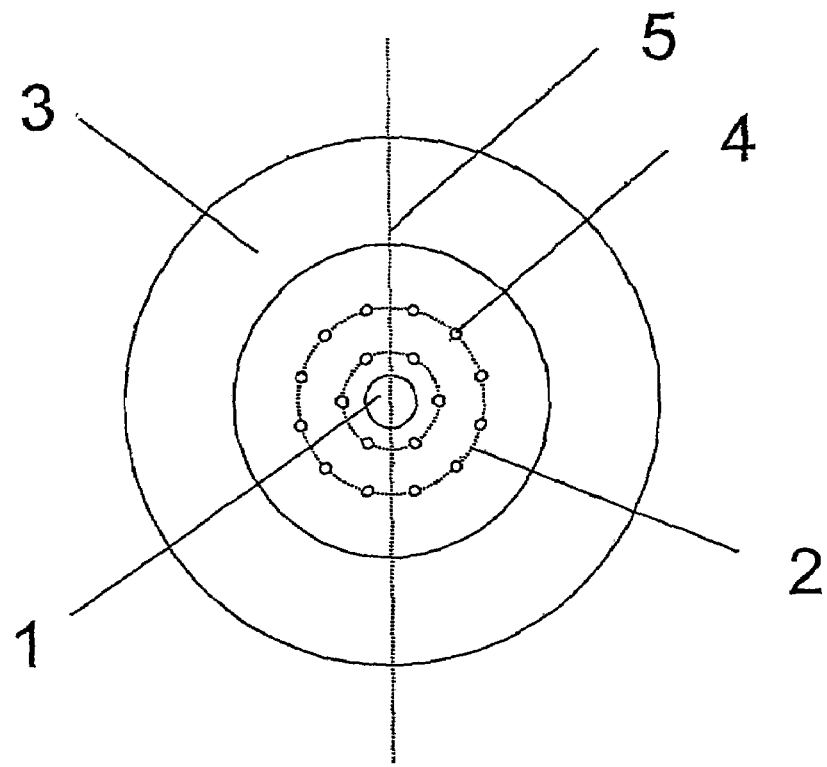
FIG. 4 shows a schematic representation of a microstructured optical fibre made according to the invention for obtaining the target refractive index profile of FIG. 3.

For example, FIG. 4 shows a microstructured optical fibre thus obtained, comprising a core region 1, a microstructured region 2, two circular shells of evenly spaced air holes 4 in the microstructured region 2, and a cladding region 3.

FIG. 5 shows the refractive index difference profile for the background materials of the core region 1, microstructured region 2 and cladding region 3—computed with reference to the cladding region refractive index—for the microstructured optical fibre of FIG. 4. The refractive indexes $n_{co}$, $n_m$ and $n_{c1}$ are 1.465, 1.445 and 1.440, respectively.

As shown in FIG. 5; the refractive index difference $\Delta_{co,m}$ is equal to about 0.020, the refractive index difference $\Delta_{m,c1}$ is about 0.005 while the refractive index difference $\Delta_{co,c1}$ is equal to about 0.025, as for the target fibre of FIG. 3.

Figures 7A, 7B:
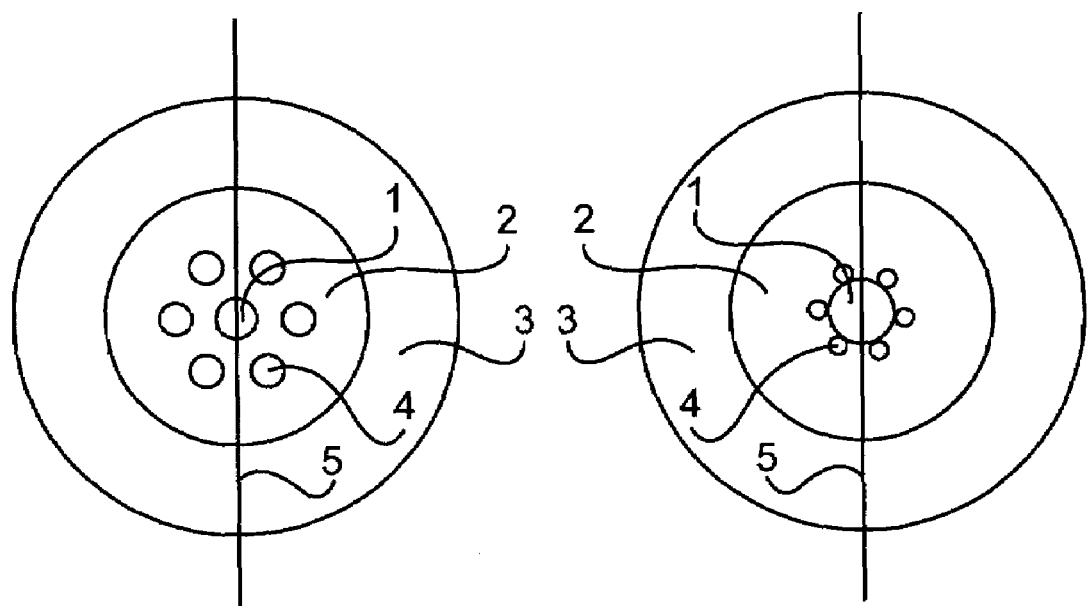
FIGS. 7a and 7b show a schematic representation of two comparison microstructured optical fibres each having one shell with six air holes.

By way of comparison, other three microstructure assisted optical fibres—having optical properties similar to that of the target fibre of FIG. 3 but not designed according to the invention—have been considered. As shown in FIGS. 6a, 7a and 7b, these fibres have a core region 1, a microstructured region 2 with three or one circular shell of evenly spaced air holes 4, and a cladding region 3.

The refractive index difference profile for the background materials of the core region 1, microstructured region 2 and cladding region 3 of these comparison fibres is the same shown in FIG. 5.

Tables 1a and 1b below show the parameters of the microstructured optical fibre of FIG. 4 (identified as 2sh18h, that is 2 shells, 18 holes in total) and of the comparison microstructure assisted optical fibres of FIGS. 6a, 7a and 7b (identified as 3sh48h, that is 3 shells, 48 holes in total; 1sh6h_1 and 1sh6h_2, that is two different example of 1 shell and 6 holes in total).

Moreover, the Tables below show the parameters of two other microstructured optical fibres 1sh12h and 1sh16h (that is 1 shell and 12 or 16 holes in total) made according to the invention, which will be dealt with hereafter.

In Table 1a, $N_h$ is the total number of holes in the microstructured region of the fibres while $d_{holes}$, $d_c$, $d_1$, $d_2$, $d_3$ are the holes diameter, the core region diameter, the first shell diameter, the second shell diameter and the third shell diameter, respectively, as clear from FIG. 6b.

In Table 1b, $\Delta_\rho$ is the distance of a centre of a microstructure belonging to the innermost shell from the edge of the core region, $\Delta_{\phi i}$ (i=1,2,3) is the distance between two adjacent microstructures belonging to the i-th shell ($\Delta_{\phi i}=d_i*\sin(\pi/N_i)$, wherein $N_i$ is the number of microstructures in the i-th shell) and $\lambda_p$ was calculated from the electric field intensity of the corresponding fibre by using the above mentioned equation (2).

Figure 8:
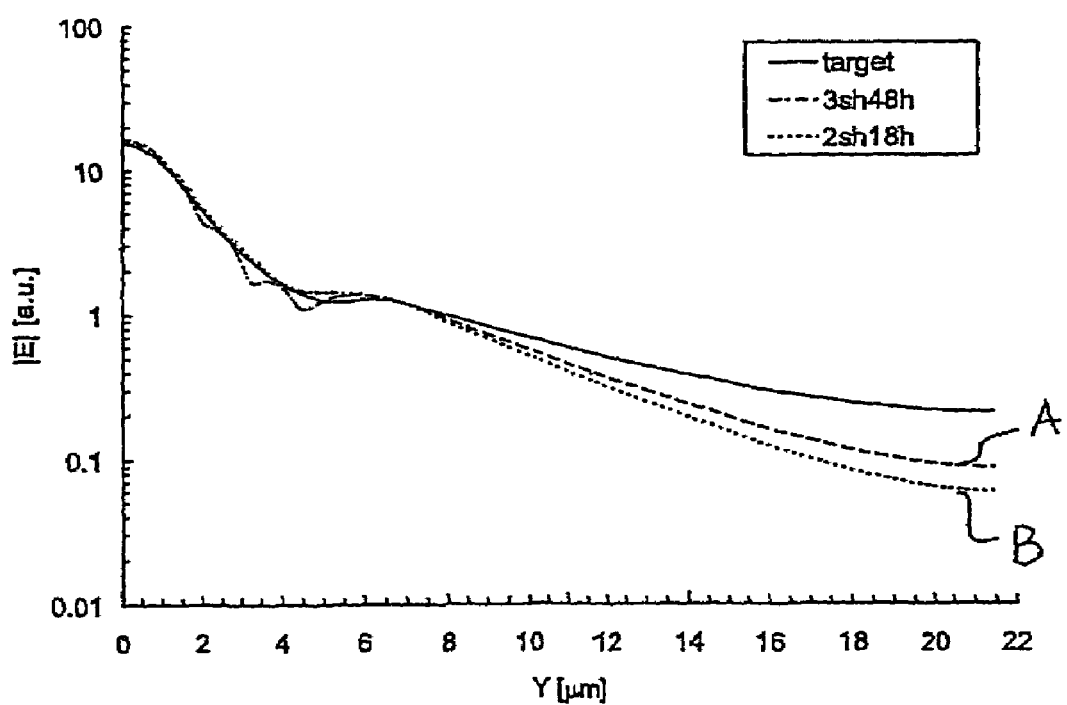

FIG. 8 shows the electric field calculated by the Applicant (by implementing a plane-waves based solution of the Maxwell equations) along, the Y axis 5 of the fibres of FIGS. 4 (2sh18h fibre) and 6a (3sh48h fibre), which was used in the $\lambda_p$ calculation. More in particular, the continuous line represents the electric field of the target fibre, line A represents the electric field of the 3sh48h fibre and line B represents the electric field of the 2sh18h fibre. The Applicant observes that for the microstructured fibres the electric field decay is faster than for the target fibre. That is, in the cladding region of the microstructured fibres the electric field intensity is smaller than in the cladding region of the target fibre. This is an advantage for the fibre attenuation considering that the cladding region material is generally not as pure as in the inner regions.

Table 2 below shows the $\rho_1$, and $\rho_2$ parameters (in µm) used for calculating the $\lambda_p$ values from equation (2).

Table 3 below shows the optical properties of the fibres in terms of WGD, chromatic dispersion slope S (computed as the derivative with respect to the wavelength of the chromatic dispersion coefficient WGD), the ratio WGD/S and the effective area ($A_{eff}$).

Table 3bis below shows the optical properties of the 1sh16h fibre in terms of D (as defined above in the description), chromatic dispersion slope S (computed as the derivative, with respect to the wavelength, of the chromatic dispersion coefficient D), the ratio D/S and the effective area ($A_{eff}$).

TABLE 1a

| Id | $N_h$ | $d_{holes}$[μm] | $d_c$[μm] | $d_1$[μm] | $d_2$[μm] | $d_3$[μm] |
|---|---|---|---|---|---|---|
| 3sh48h | 48 | 0.257 | 2.375 | 3.724 | 6.422 | 9.120 |
| 2sh18h | 18 | 0.489 | 2.375 | 4.389 | 8.417 | / |
| 1sh6h__1 | 6 | 1.781 | 2.375 | 6.413 | / | / |
| 1sh6h__1 | 6 | 1.000 | 3.725 | 4.725 | / | / |
| 1sh12h | 12 | 0.400 | 2.800 | 3.900 | / | / |
| 1sh16h | 16 | 0.300 | 10.000 | 12.300 | / | / |

TABLE 1b

| Id | $\Delta_\rho$ [μm] | $\Delta_{\phi 1}$ [μm] | $\Delta_{\phi 2}$ [μm] | $\Delta_{\phi 3}$ [μm] | $\lambda_p$ [μm] | $\Delta_\rho/\lambda_p$ | $\Delta_{\phi 1}/\lambda_p$ | $\Delta_{\phi 2}/\lambda_p$ | $\Delta_{\phi 3}/\lambda_p$ |
|---|---|---|---|---|---|---|---|---|---|
| 3sh48h | 0.67 | 1.43 | 1.25 | 1.19 | 1.95 | 0.35 | 0.73 | 0.64 | 0.61 |
| 2sh18h | 1.01 | 2.19 | 2.18 | / | 1.99 | 0.51 | 1.11 | 1.10 | / |
| 1sh6h__1 | 2.02 | 3.21 | / | / | 1.41 | 1.43 | 2.27 | / | / |
| 1sh6h__2 | 0.50 | 2.36 | / | / | 0.97 | 0.52 | 2.44 | / | / |
| 1sh12h | 0.55 | 1.01 | / | / | 0.74 | 0.74 | 1.36 | / | / |
| 1sh16h | 1.15 | 2.40 | / | / | 2.23 | 0.52 | 1.08 | / | / |

TABLE 2

| Id | $\rho_1$ | $\rho_2$ |
|---|---|---|
| 3sh48h | 1.188 | 5.235 |
| 2sh18h | 1.188 | 5.216 |
| 1sh6h__1 | 1.188 | 5.266 |
| 1sh6h__2 | 1.863 | 2.863 |
| 1sh12h | 1.400 | 2.500 |
| 1sh16h | 5.000 | 7.300 |

TABLE 3

| Id | WGD [ps/(nm * Km)] | S [ps/(nm² * Km)] | WGD/S [nm] | $A_{eff}$ [μm²] |
|---|---|---|---|---|
| target | −397 | −7.9 | 50 | 23 |
| 3sh48h | −382 | −7.2 | 53 | 19 |
| 2sh18h | −378 | −8.0 | 47 | 18 |
| 1sh6h__1 | −292 | −31.5 | 9 | 10 |
| 1sh6h__2 | −340 | −9.0 | 38 | 12 |
| 1sh12h | −123 | −1.6 | 75 | 8 |

TABLE 3bis

| Id | D [ps/(nm * Km)] | S [ps/(nm² * Km)] | D/S [nm] | $A_{eff}$ [μm²] |
|---|---|---|---|---|
| 1sh16h | 17 | 0.038 | 447 | 80 |

As shown in Table 1b, the $\lambda_p$ value calculated from the fibres of FIGS. 4 and 6 (2sh18h and 3sh48h) well approximate the $\lambda_p$ value of the target fibre (about 1.8 μm) while the $\lambda_p$ values calculated from the fibres of FIGS. 7a and 7b (1sh6h__1 and 1sh6h__2, respectively) diverge from it.

Furthermore, as shown in Table 3, among the first four fibres, only the fibres 2sh18h and 3sh48h well approximate the optical properties of the target fibre. However, as shown in Table 1b, only the 2sh18h fibre meets the relationship $1 \leq \Delta_{\phi i}/\lambda_p \leq 1.5$ while the 3sh48h fibre does not. That is, only the 2sh18h fibre allows to achieve the desired optical properties with a number of holes which allows the above mentioned conflicting requirements (smooth, effective refractive index changing effect and stability versus technological problems in fibre production, splicing, attenuation and strength) to be balanced. Indeed, the 3sh48h fibre allows to achieve the desired optical properties with a too high number of holes compared to the 2sh18h fibre, which brings with it technological problems in terms of fibre production, splicing, attenuation and strength. Furthermore, only the 2sh18h fibre complies with the relationship $0.5 \leq \Delta_\rho/\lambda_p \leq 0.75$.

As to the 1sh6h__1 and 1sh6h__2 fibres, and in view of a series of other tests made by the Applicant (not shown), the Applicant notes that it was not possible to comply with the relationship $1 \leq \Delta_{\phi i}/\lambda_p \leq 1.5$ according to the invention and, at the same time, to achieve the optical properties of the target fibre with a single shell of holes.

The hole diameter $d_h$ shown in Table 1a was calculated by the Applicant by implementing a plane-waves based solution of the Maxwell equations so as to obtain the WGD and S parameters as close as possible to those of the target fibre, once fixed the number of shells and the distances $\Delta_{\phi i}$ between the microstructures.

Figure 11:
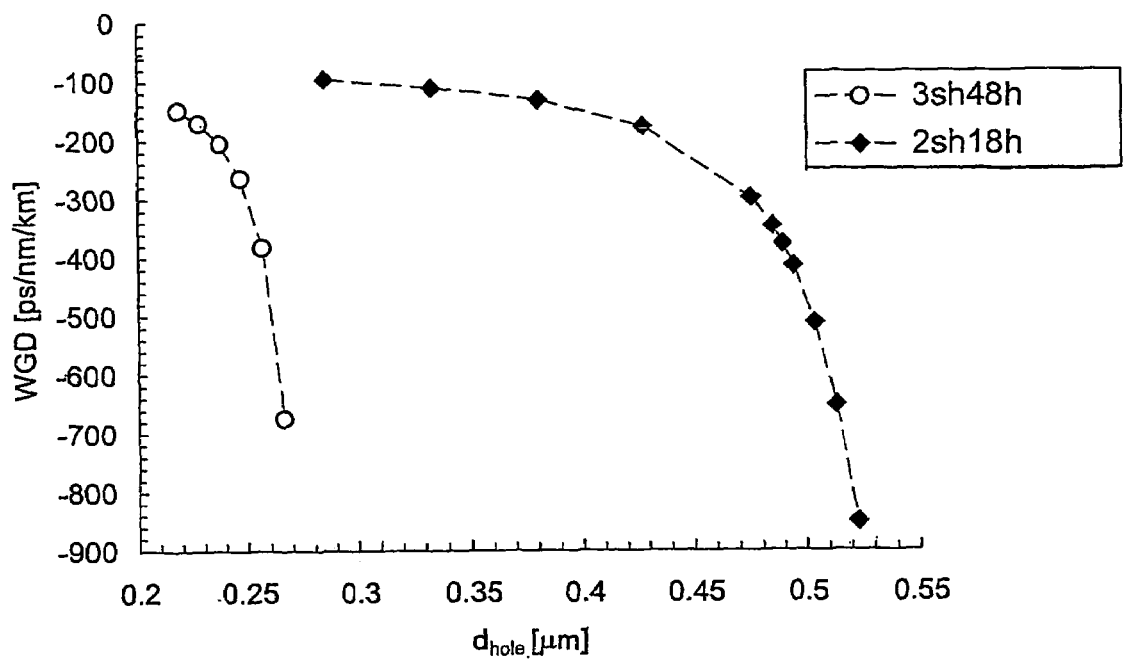
Figure 12:
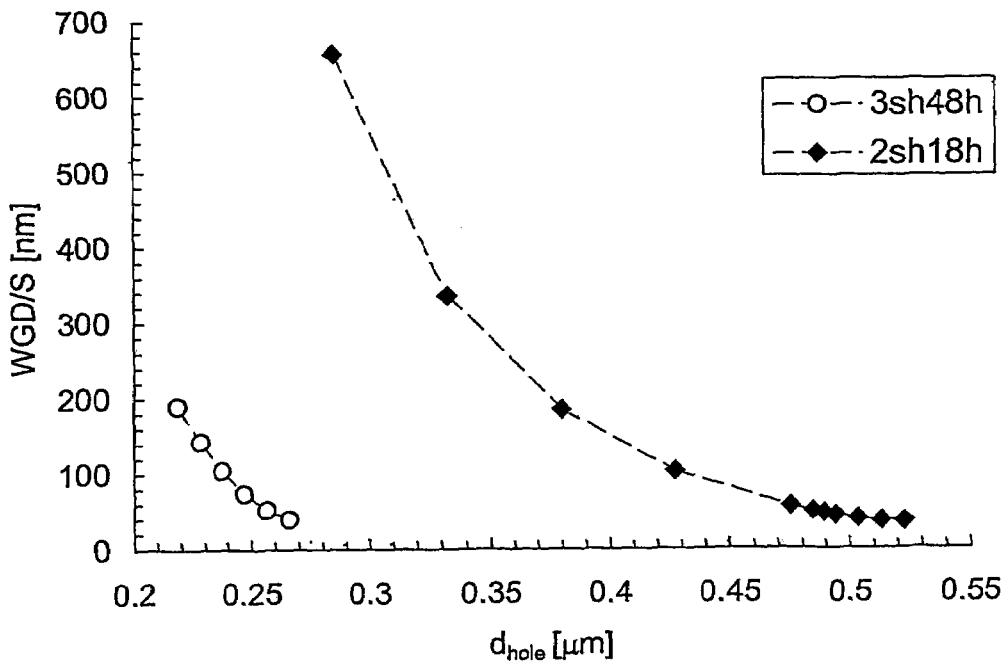

For example, FIGS. 11 and 12 show the WGD and the ratio WGD/S thus calculated as a function of $d_h$ for the 3sh48h and 2sh18h fibres.

The Applicant notes that for $d_h$ values lower than $d_{h,min}$ (where $d_{h,min} \cong 0.2$ μm for the 3sh48h fibre and $d_{h,min} \cong 0.3$ μm for the 2sh18h fibre) the WGD is substantially constant and much smaller, in magnitude, than the WGD of the target fibre. For increasing $d_h$ values, the WGD increases in magnitude up to the value of the target fibre and beyond it.

The best results in terms of $d_h$, WGD and S achieved for the 3sh48h and 2sh18h fibres with respect to the target values are those shown in Tables 1a and 3.

The Applicant also analyzed the stability of the WGD and WGD/S ratio upon variations of some parameters of the fibres of FIGS. 4, 6 and 7. In particular, the Applicant calculated the variation of the WGD or WGD/S ratio with respect to the nominal value [(WGD)₀ or (WGD/S)₀] upon percentage variations (Δ%) of the first and second shell diameters with respect to the nominal ones, by keeping the hole diameter $d_h$ fixed.

Figure 9:
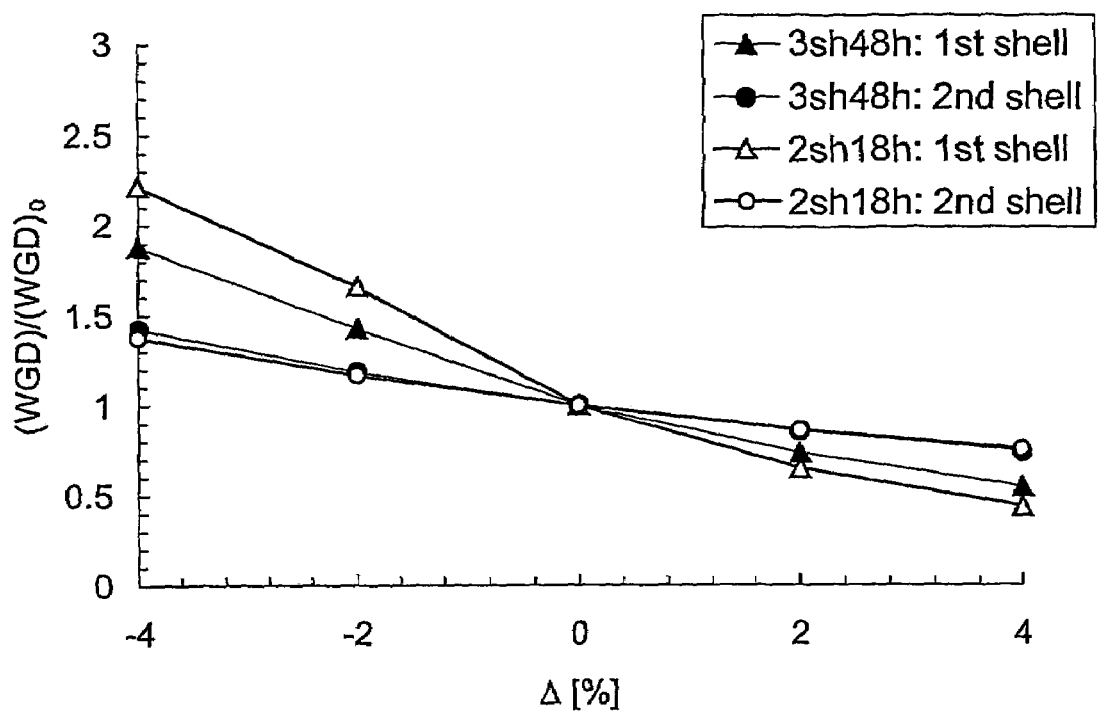
FIG. 9 shows the results obtained for WGD stability upon variations of the first and second shell diameters of the fibres of FIGS. 4 and 6a, by keeping the hole diameter fixed.
Figure 10:
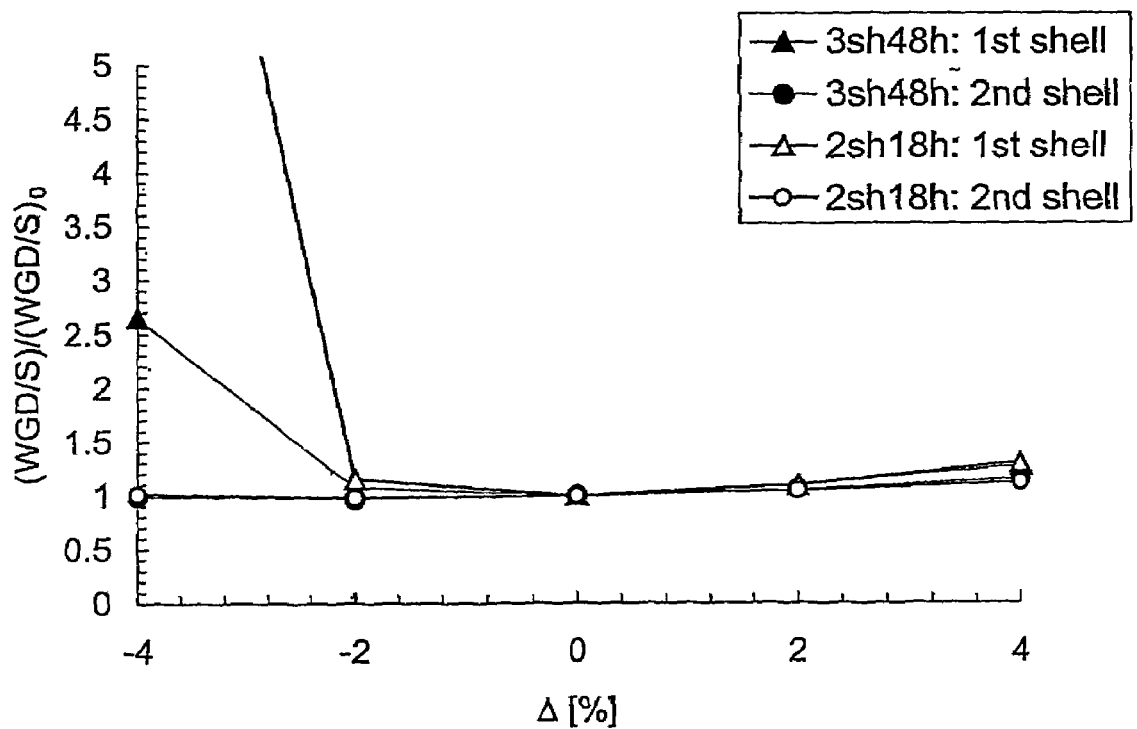
FIG. 10 shows the results obtained for WGD/S stability upon variations of the first and second shell diameters of the fibres of FIGS. 4 and 6a, by keeping the hole diameter fixed.

The results thus obtained for the 3sh48h and 2sh18h fibres are shown in FIGS. 9 and 10.

The Applicant notes that the WGD is least sensitive to variations of the second shell diameter while it is more sensitive to variations (especially, decreases) of the first shell diameter. However, in general, the WGD shows reasonably small variations.

As to the ratio WGD/S, the Applicant observes that the results achieved are fully satisfactory for Δ% > −2%. On this purpose, it is noted that in an optical communication system the WGD/S stability is in general more important than the WGD stability. In fact, while a WGD which is out of target may be compensated in a relatively easy way (for example, by properly adjusting the length of the compensating fibre) a WGD/S which is out of target is very difficult to compensate and requires the use of additional compensation devices.

On the contrary, the instability achieved for the 1sh6h_1 and 1sh6h_2 fibres was so high that it was even impossible to clearly represent the results achieved. For example, shell diameter variations as small as 2% led to a change of the S sign and therefore to very high variations of WGD/S.

In general, the Applicant found that microstructure assisted optical fibres having the distance $\Delta_\phi$ between the centres of any couple of adjacent microstructures not higher than $1.5\lambda_p$ show optimal optical performance in terms of stability and smooth and effective changing effect of the refractive index. Moreover, microstructure assisted optical fibres having the distance $\Delta_\phi$ at least equal to $\lambda_p$ allow to achieve satisfactory results in terms of production process, strength, attenuation and splicing.

As stated above, Tables 1-3 show the parameters of another microstructured optical fibre 1sh12h (that is 1 shell and 12 holes in total) made according to the invention.

As shown in Table 1b, this fibre meets both the relationships $1 \leq \Delta_\phi/\lambda_p \leq 1.5$ and $0.50 \leq \Delta_\rho/\lambda_p \leq 0.75$.

This 1sh12h fibre is an example of microstructured fibre of the type disclosed with reference to FIG. 1. That is, it only has the core region 1 and the microstructured region 2. The microstructured region 2 is made from pure silica while the core region 1 is made from silica doped with germanium so as to obtain a refractive index difference of 0.03.

This fibre may, for example, be used in a fibre Raman amplifier.

For a 1450 nm optical pump and a 1550 nm optical signal, the Raman gain $G_R$ of the 1sh12h fibre is 23 1/Km/W, wherein $G_R$ was computed as follows:

$$G_R = \frac{\int\int d\vec{\rho} I_s(\vec{\rho}) \cdot I_p(\vec{\rho}) \cdot g_r(\vec{\rho})}{\int d\vec{\rho} I_s(\vec{\rho}) \int d\vec{\rho} I_p(\vec{\rho})}$$

where $\vec{\rho}$ is the vector perpendicular to the fibre axis, $I_s$ and $I_p$ are the intensities at signal and pump wavelength respectively, and $g_r$ is the Raman gain coefficient which depends on the material composition. This coefficient in pure $GeO_2$ is about 7.7 times larger than in silica ($g_{r,SiO2}=0.827\ 10^{-13}$ m/W and $g_{r,GeO2}=6.34\ 10^{-13}$ m/W at $\lambda_{pump}=1450$ nm, see M. E. Lines, J. Appl. Phys. Vol. 62, page 4363, 1987). For $GeO_2$ doped $SiO_2$ the following relation was used (see J. Bromage, K. Rottwitt, and M. E. Lines, IEEE Photonics Technology Letters, vol. 14, page 24, 2002):

$$g_{r,xGeO2}(\lambda)=(1-2 \cdot x_{GeO2}) \cdot g_{r,SiO2}+x_{GeO2} \cdot g_{r,GeO2}$$

where $x_{GeO2}$ is the $GeO_2$ concentration.

The Raman gain $G_R$ governs a gain known in the art as on/off gain ($G_{on/off}$) at length L of fibre having an attenuation $\alpha_{pump}$ at $\lambda_{pump}$ through the formula:

$$G_{on/off}[dB] = 4.34 \cdot G_r \cdot P_{pump} \cdot \frac{1-e^{-\alpha_{pump} \cdot L}}{\alpha_{pump}}$$

where $P_{pump}$ is the pump power.

As stated above, Tables 1, 2 and 3bis show the parameters of another microstructured optical fibre 1sh16h (that is 1 shell and 16 holes in total) made according to the invention.

As shown in Table 1b, this fibre meets both the relationships $1 \leq \Delta_\phi/\lambda_p \leq 1.5$ and $0.50 \leq \Delta_\rho/\lambda_p \leq 0.75$.

This 1sh16h fibre is an example of microstructured fibre of the type disclosed with reference to FIG. 1. That is, it only has the core region 1 and the microstructured region 2. The microstructured region 2 is made from pure silica while the core region 1 is made from silica doped with germanium so as to obtain a refractive index difference of $3*10^{-3}$.

This fibre may, for example, be used for the transmission of optical signals in an optical communication line and/or system.

Table 4 below compares the chromatic dispersion coefficient D (as defined above in the description), the chromatic dispersion slope S (computed as the derivative, with respect to the wavelength, of the chromatic dispersion coefficient D) and the effective area $A_{eff}$ of the 1sh16h fibre with those of a standard step index fibre conventionally used for the transmission of optical signals in an optical communication line and/or system.

TABLE 4

| value @ 1550 nm | standard step index fibre | 1sh16h fibre |
|---|---|---|
| D [ps/nm * Km)] | 17-18 | 17 |
| S [ps/nm$^2$ * Km)] | 0.055-0.060 | 0.038 |
| A$_{eff}$ [µm]$^2$ | 75-80 | 80 |

As shown in Table 4, with the 1sh16h fibre of the invention a lower chromatic dispersion slope S value is advantageously achieved. Such a low chromatic dispersion slope value is difficult to achieve in a standard step index fibre. Furthermore, the chromatic dispersion coefficient D and effective area $A_{eff}$ of the 1sh16h fibre of the invention are comparable with the best values at present achievable through a standard step-index fibre.

A microstructure assisted optical fibre according to the invention may be used in an optical communication line and/or system. For example, it may be used for the chromatic dispersion and/or slope compensation, for the transmission of optical signals, for achieving a desired Raman gain or for compensating for chromatic dispersion-slope and, at the same time, achieving a desired Raman gain.

Figure 13:
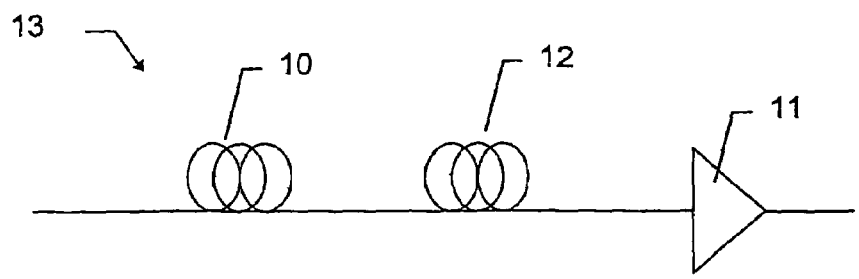
FIG. 13 shows an embodiment of an optical communication line according to the invention.

For example, FIG. 13 shows an optical communication line 13 comprising a microstructure assisted optical fibre according to the invention.

More in particular, the optical communication line 13 comprises an optical cable, comprising a transmission optical fibre 10, and a microstructure assisted optical fibre 12 according to the invention, placed downstream the transmission fibre 10.

The transmission optical fibre 10 is an optical fibre conventionally used for long-haul signal transmission, preferably of the single mode type.

Furthermore, it has a length that can range from few kilometers to few hundred kilometers. Typically, its length is between 30 and 200 Km.

The microstructured optical fibre 12 may, for example, be designed according to the invention in such a way as to compensate for the chromatic dispersion and/or slope of the transmission optical fibre 10.

According to the embodiment illustrated in FIG. 13, the optical communication line 13 includes, besides the fibres 10 and 12 also an optical amplifier 11, located as an example downstream the compensating optical fibre 12.

Typically, the optical amplifier 11 is of the active optical fibre conventional type. For example, it comprises a length of active optical fibre doped with erbium and a pump source (for example, a laser source) to pump the active optical fibre at a pumping wavelength $\lambda_{pump}$. The pump source is coupled with an input end of the active optical fibre through a coupler (for example of the fused fibre type)—preferably wavelength selective—so that the signal and pumping light propagate together through the active optical fibre.

However, according to the needs of the system, the pump source can also be coupled with the output end of the active fibre so that the signal and pumping light propagate in opposite directions through the active fibre. Alternatively, a respective pump source can be coupled with each end of the active fibre.

In the case of erbium doped active optical fibre, the wavelength $\lambda_{pump}$ of the pumping signal is typically equal to about 980 or 1480 nm.

The optical amplifier 11 can possibly also comprise an optical isolator for blocking the backward reflections of the signal light.

Moreover, the optical amplifier 11 may optionally comprise more than one stage of optical amplification.

As an alternative, optical amplifier 11 may be a Raman amplifier including Raman active fibre and a pump source for stimulating Raman gain in the Raman active fibre, together with a coupler for coupling the pumping light from the pump source to the Raman active fibre. The Raman active fibre can be a microstructure assisted fibre according to the invention.

According to a still further embodiment (not shown) of an optical communication line, optical amplifier 11 may be absent and microstructure assisted fibre 12 can be of a type providing Raman gain. In this embodiment, a suitable pump source and a coupler are provided to couple pumping light into the microstructure assisted fibre 12, so as to stimulate Raman gain.

Typically, according to an embodiment not illustrated, the optical communication line 13 comprises a plurality of transmission optical fibres, a plurality of optical amplifiers interposed between one transmission optical fibre and the other and at least one microstructured optical fibre according to the invention used, for example, to compensate for the chromatic dispersion coefficient and/or the chromatic dispersion slope of at least part of the plurality of transmission optical fibres.

Such compensating microstructured optical fibre(s) can be located at the beginning, at the end and/or within said optical communication line 1.

Figure 14:
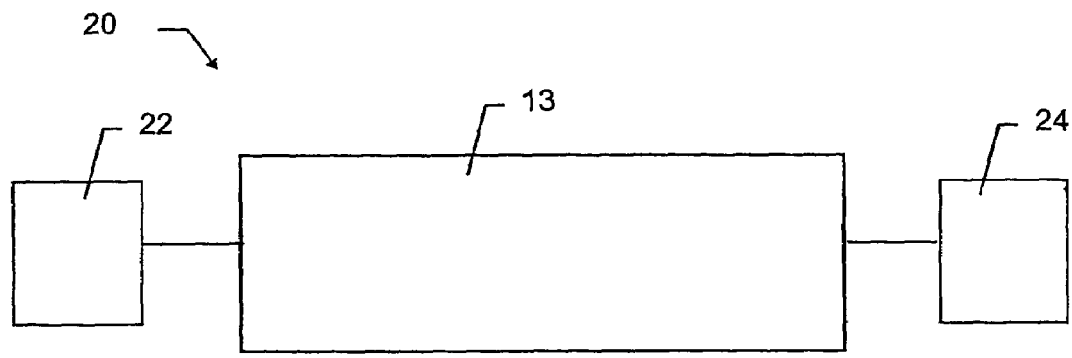
FIG. 14 shows an embodiment of an optical communication system according to the invention.

FIG. 14 illustrates an optical communication system 20 according to the invention comprising a transmitting station 22, a receiving station 24 and an optical communication line 13 comprising a microstructured fibre according to the invention.

For example, as to the characteristics of the optical communication line 13 reference is made to what already disclosed above with reference to FIG. 13.

Typically, the transmitting station 22 comprises a laser source for supplying an optical signal, an optical modulator and an optical power amplifier (not shown).

In the case of WDM transmission, the transmitting station 22 comprises a plurality of laser sources adapted to supply a plurality of optical signals with wavelengths different from each other, a corresponding plurality of optical modulators, at least one wavelength division multiplexer device and an optical power amplifier (not shown).

In any case, the transmitting station 22 can also comprise a chromatic dispersion precompensation section.

Typically, the laser sources are adapted to emit continuous optical signals at the typical wavelengths of fibre optic telecommunications like, for example, in the range of about 1300-1700 nm and, typically, in the third transmission window of optical fibres around 1500-1700 nm.

Typically, the optical modulators are conventional amplitude modulators, for example, of the Mach Zehnder interferometric type. They are driven by respective electrical signals carrying the main information to be transmitted along the optical communication line 13 so as to modulate the intensity of the continuous optical signals in output from the laser sources and to supply a plurality of optical signals at a predetermined bit rate. For example, said bit rate is 2.5 Gbit/s, 10 Gbit/s or 40 Gbit/s.

The optical signals thus modulated are then wavelength multiplexed by one or more multiplexer devices arranged in one or more multiplexing sub bands.

Such multiplexer devices comprise, for example, a conventional fused fibre or planar optical coupler, a Mach-Zehnder device, an AWG (Arrayed Waveguide Grating), an interference filter and/or a micro-optic filter and the like.

The multiplexed optical signals in output from the multiplexer device are then amplified by the optical power amplifier and sent along the optical communication line 13.

The optical power amplifier is, for example, a conventional active optical fibre amplifier doped with erbium as described above.

The receiving station 24 typically comprises a photodetector (not shown) to convert the optical signal into a corresponding electrical signal.

In the case of WDM transmission, the receiving station 24 typically comprises at least one demultiplexer device and a plurality of photodetectors (not shown).

The demultiplexer device comprises one or more conventional devices, arranged in one or more demultiplexing sub bands, adapted to separate from each other the optical signals at different wavelength.

Such devices comprise, for example, a conventional fused fibre or planar optics coupler, a Mach-Zehnder device, an AWG (Arrayed Waveguide Grating), an interference filter and/or a micro-optic filter and the like.

The optical signals in output from the demultiplexer device are then converted into corresponding electrical signals by the corresponding plurality of photodetectors.

These photodetectors are, for example, conventional photodiodes.

The electrical signals in output from the photodetectors are then processed depending on the applications.

According to an embodiment, the optical communication line 13 and the optical communication system 20 may be of the bidirectional type.

The invention claimed is:

1. A microstructured optical fibre comprising a core region with a material having a refractive index $n_{co}$ and a microstructured region surrounding the core region with a background material having a refractive index $n_m$ which is lower than the refractive index $n_{co}$, the microstructured region comprising a plurality of microstructures having a refractive index different from the refractive index $n_m$, the distance $\Delta_\phi$ between the centers of any couple of adjacent microstructures being at least equal to about $\lambda_p$ and not higher than about 1.5$\lambda_p$, wherein $\lambda_p$ is the spatial variation length of the electric field intensity in the microstructured region.

2. The microstructured optical fibre according to claim 1, wherein the distance $\Delta_\phi$ is not higher than about 1.3$\lambda_p$.

3. The microstructured optical fibre according to claim 1, wherein a distance $\Delta_p$ between the center of an innermost microstructure and the edge of the core region is at least of about 0.50$\lambda_p$.

4. The microstructured optical fibre according to claim 1, wherein a distance $\Delta_p$ between the center of an innermost microstructure and the edge of the core region is not higher than about 0.75$\lambda_p$.

5. The microstructured optical fibre according to claim 1, wherein $\lambda_p$ is not higher than 7 μm.

6. The microstructured optical fibre according to claim 1, wherein $\lambda_p$ is at least about 1 μm.

7. The microstructured optical fibre according to claim 1, wherein the microstructures have a diameter of at least about 0.2 μm.

8. The microstructured optical fibre according to claim 1, wherein the plurality of microstructures is arranged in at least one shell.

9. The microstructured optical fibre according to claim 1, further comprising a cladding region surrounding the microstructured region.

10. The microstructured optical fibre according to claim 9, wherein the cladding region comprises a material having a refractive index $n_{c1}$ lower than the refractive index nm of the background material of the microstructured region.

11. The microstructured optical fibre according to claim 1, wherein the microstructures have a refractive index lower than the refractive index $n_m$ of the background material of the microstructured region.

12. An optical communication line comprising a microstructured optical fibre according to claim 1.

13. An optical communication system comprising a transmitting station for supplying an optical signal, a receiving station for receiving the optical signal and an optical communication line according to claim 12.

14. A method for making a microstructured optical fibre starting from a target fibre, comprising the steps of making a microstructured preform and drawing the microstructured preform into the microstructured optical fibre, wherein the step of making the microstructured preform comprises the steps of:
   a) providing a core region having a material with a refractive index $n_{co}$;
   b) providing a microstructured region, surrounding the core region, having a background material with a refractive index $n_m$ which is lower than the refractive index $n_{co}$; and
   c) providing the microstructured region with a plurality of microstructures having a refractive index different from the refractive index $n_m$; the step of making the preform further comprising the step of:
   d) spacing the microstructures apart from each other so that in the drawn microstructured optical fibre the distance $\Delta_\phi$ between the centers of any couple of microstructures is at least equal to about $\lambda_p$ and not higher than about 1.5$\lambda_p$, wherein $\lambda_p$ is the spatial variation length of the electric field intensity of the target fibre.

15. The method according to claim 14, wherein the refractive index difference $\Delta n_{co,m}$ between the core region and the background material of the microstructured region is substantially the same as the refractive index difference between a core region and an outer core region of the target fibre.

16. The method according to claim 14, wherein the step of making the preform also comprises the step of: e) providing a cladding region surrounding the microstructured region.

17. The method according to claim 16, wherein the cladding region provided in step e) has a refractive index $n_{c1}$ so that the refractive index difference $\Delta n_{m,c1}$ between the background material of the microstructured region and the cladding region is substantially the same as the refractive index difference between an outer core region and a cladding region, surrounding the outer core region, of the target fibre.

18. A microstructured optical fibre preform comprising a core region with a material having a refractive index $n_{co}$ and a microstructured region, surrounding the core region, with a background material having a refractive index $n_m$ which is lower than the refractive index $n_{co}$, the microstructured region comprising a plurality of microstructures having a refractive index different from the refractive index $n_m$, the microstructures being spaced apart so that in a microstructured optical fibre drawn from the preform the distance $\Delta_\phi$ between the centers of any couple of microstructures is at least equal to about $\lambda_p$ and not higher than about 1.5$\lambda_p$, wherein $\lambda_p$ is the spatial variation length of the electric field intensity in the microstructured region of the microstructured optical fibre drawn from the preform.

* * * * *